US008743963B2

(12) United States Patent
Kanumuri et al.

(10) Patent No.: US 8,743,963 B2
(45) Date of Patent: Jun. 3, 2014

(54) IMAGE/VIDEO QUALITY ENHANCEMENT AND SUPER-RESOLUTION USING SPARSE TRANSFORMATIONS

(75) Inventors: Sandeep Kanumuri, Sunnyvale, CA (US); Onur G. Guleryuz, San Francisco, CA (US); Reha Civanlar, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1236 days.

(21) Appl. No.: 12/140,829

(22) Filed: Jun. 17, 2008

(65) Prior Publication Data

US 2009/0046995 A1 Feb. 19, 2009

Related U.S. Application Data

(60) Provisional application No. 60/955,433, filed on Aug. 13, 2007.

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC .................... 375/240.2; 375/240.02; 375/241

(58) Field of Classification Search
USPC .................... 375/240–241; 386/264, 269, 271
See application file for complete search history.

(56) References Cited

U.S. PATENT DOCUMENTS

| 5,666,209 | A  | * | 9/1997  | Abe           | 386/327   |
|-----------|----|---|---------|---------------|-----------|
| 5,844,611 | A  | * | 12/1998 | Hamano et al. | 375/240.2 |
| 6,141,054 | A  | * | 10/2000 | Lee et al.    | 348/441   |
| 6,438,275 | B1 | * | 8/2002  | Martins et al.| 382/300   |
| 7,284,026 | B2 | * | 10/2007 | Nakayama      | 708/400   |
| 2005/0030393 | A1 | * | 2/2005 | Tull       | 348/241   |
| 2008/0246768 | A1 | * | 10/2008 | Murray et al. | 345/427 |
| 2009/0046995 | A1 | * | 2/2009 | Kanumuri et al. | 386/114 |

FOREIGN PATENT DOCUMENTS

| EP | 1531424 A2    | 5/2005  |
| JP | 06-054172 A2  | 2/1994  |
| JP | 08-294001 A2  | 11/1996 |
| JP | 10-271323 A2  | 10/1998 |

OTHER PUBLICATIONS

C.S.Boon et al: "Sparse super-resolution reconstructions of video from mobile devices in digital TV broadcast application" Proc. of the SPIE, USA, vol. 6312, Aug. 15, 2006, pp. 63120M-1-63120M-12.*
"Warped Discrete Cosine Transform and Its Application in Image Compression", Cho et al, IEEE transactions on Circuits and Systems for Video Technology, vol. 10, No. 8, Dec. 2000.*
PCT International Preliminary Report on Patentability for PCT Patent Application No. PCT/US2008/073203, Dec. 29, 2010, 8 pgs.

(Continued)

*Primary Examiner* — Benjamin H Elliott, IV
(74) *Attorney, Agent, or Firm* — Blakely, Sokoloff, Taylor & Zafman LLP

(57) ABSTRACT

A method and apparatus is disclosed herein for a quality enhancement/super resolution technique. In one embodiment, the method comprises receiving a first version of media at a first resolution and creating a second version of the media at a second resolution higher or equal to the first resolution using at least one transform and adaptive thresholding.

57 Claims, 12 Drawing Sheets

(56) References Cited

OTHER PUBLICATIONS

Boon, Choong S., et al., "Sparse super-resolution reconstructions of video from mobile devices in digital TV broadcast applications", Proc. of SPIE, Aug. 15, 2006, pp. 63120M-1-63120M-12, vol. 6312.

Guleryuz, Onur G., "Predicting Wavelet Coefficients Over Edge Using Estimates Based on Nonlinear Approximants", Data Compression Conference 2004, Snowbird, Utah, USA, Mar. 23, 2004, pp. 162-171.

Seunghyeon, Rhee, et al., "Discrete cosine transform based regularized high-resolution image reconstruction algorithm", Optical Engineering, SPIE, USA, pp. 1348-1356, vol. 38—No. 8.

Guleryuz, Onur G., "Nonlinear Approximation Based Image Recovery Using Adaptive Sparse Reconstructions and Iterated Denoising—Part I: Theory", IEEE Trans. On Image Processing, USA, Mar. 2006, pp. 539-554, vol. 15—No. 3.

Guleryuz, Onur G., "Nonlinear Approximation Based Image Recovery Using Adaptive Sparse Reconstructions and Iterated Denoising—Part II: Adaptive Algorithms", IEEE Trans. On Image Processing, USA, Mar. 2006, pp. 555-571, vol. 15—No. 3.

Jijim C.V., et al., "Single frame image super-resolution: should we process locally or globally?", Multidimensional Systems and Signal Processing, Mar. 6, 2007, pp. 123-152, vol. 18—No. 2-3, Kluwer Academic Publishers.

Park, Min Kyu, et al., "Super-Resolution Image Reconstruction: A Technical Overview", IEEE Signal Processing Magazine, USA, May 1, 2003, pp. 21-36, vol. 20—No. 3.

Hunt, B.R., et al., "Super-Resolution of Images: Algorithms, Principles, Performance", International Journal of Imaging Systems and Technology, Dec. 21, 1995, pp. 297-304, vol. 6—No. 4, Wiley and Sons, New York, USA.

PCT International Search Report for PCT Patent Application No. PCT/US2008/073203, dated Jul. 17, 2009, 4 pages.

PCT Written Opinion of the International Searching Authority for PCT Patent Application No. PCT/US2008/073203, dated Jul. 17, 2009, 8 pages.

ITU-Recommendation H.264 & ISO/IEC 14496-10 (MPEG-4) AVC, "Advanced Video Coding for Generic Audiovisual Services", version 3. 2005.

Y. Vatis and J. Ostermann, "Locally Adaptive Non-Separable Interpolation Filter for H.264/AVC", IEEE ICIP, Oct. 2006.

O.G. Guleryuz, "Predicting wavelet coefficients over edges using estimates based on nonlinear approximants", Pro. Data Compression Conference, Apr. 2004.

Japanese Office Action for related Japanese Patent Application No. 2011-514565, Sep. 18, 2012, 4 pgs.

\* cited by examiner

IMAGE/VIDEO QUALITY ENHANCEMENT AND SUPER-RESOLUTION USING SPARSE TRANSFORMATIONS

PRIORITY

The present patent application claims priority to and incorporates by reference the corresponding provisional patent application Ser. No. 60/955,433, titled, "Super-Resolution Using Sparse Transformations," filed on Aug. 13, 2007.

FIELD OF THE INVENTION

The present invention relates generally to image/video signal processing. More particularly, the present invention is related to enhancing the quality of and/or increasing the spatial resolution of image/video signals.

BACKGROUND OF THE INVENTION

Image and video signal processing is widely used in a number of applications today. Often a need arises for an image or video of a particular resolution and only an image or video of a lower resolution is available. In such a case, there are a number of methods that are used to use the lower resolution version to create an image of higher resolution. These existing methods include applying linear or simple non-linear interpolation filters to the lower resolution image or video.

Examples of the use of linear or non-linear interpolation filters include a bilinear interpolation filter such as described in Gonzalez & Woods, "Digital Image Processing", Pearson Education, $2^{nd}$ Edition; a linear interpolation filter described in ITU-T Recommendation H.264 & ISO/IEC 14496-10 (MPEG-4) AVC, "Advanced Video Coding for Generic Audiovisual Services", version 3: 2005; and a non-separable interpolation filter described in Vatis & Ostermann, "Locally Adaptive Non-Separable Interpolation Filter for H.264/AVC", IEEE ICIP, October 2006. However, each of these three techniques is applicable on image/video frames that have smoothly varying pixel values. This is because they are derived using smooth image models and the filters are typically restricted to lowpass filters. Thus, they are not applicable on many types of regions, such as on slant edges, textures etc. Furthermore, at least with respect to ITU-T Recommendation H.264 and Vatis & Ostermann, the techniques are applicable only in a video compression application where previous frame(s) shifted by a fraction of pixel is/are used to predict the current frame.

Also, very simple transform-based methods exist for increasing the resolution of an image/video, but require a large number of iterations. One such example is described in Guleryuz, "Predicting Wavelet Coefficients Over Edges Using Estimates Based on Nonlinear Approximants", Proc. Data Compression Conference, April 2004. However, this technique is limited to block transforms with various simplifications that are not applicable on slant edges and textures and involves many iterations of a basic method to get good quality and the complexity is prohibitively expensive.

SUMMARY OF THE INVENTION

A method and apparatus is disclosed herein for a quality enhancement/super resolution technique. In one embodiment, the method comprises receiving a first version of media at a first resolution and creating a second version of the media at a second resolution higher or equal to the first resolution using at least one transform and adaptive thresholding.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A-4M illustrate examples of masks that correspond to a library of sub-frame types.

DETAILED DESCRIPTION OF THE PRESENT INVENTION

Figure 1A:
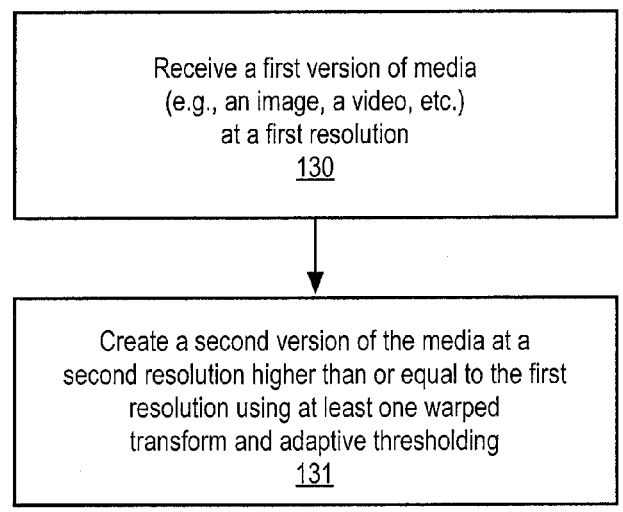
FIG. 1A is a flow diagram of one embodiment of a process for performing quality enhancement/super-resolution of media.

An enhancement technique to enhance the quality of video and/or images is described. In one embodiment, the technique also acts as a super-resolution technique to generate a high-resolution image and/or video corresponding to a low-resolution input image and/or video, respectively. In one embodiment, this is accomplished by adding multiple pixel positions for each pixel position in the low-resolution image and/or video. For purposes herein, the pixel positions that are added are known as interpolated positions and the positions that come from the low-resolution image are known as original positions.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Fast and high performance quality enhancement and/or super-resolution techniques for media (e.g., images, videos, etc.) are disclosed. These techniques allow the rendering of high-quality and high-resolution (if necessary) media (e.g., images, videos, etc.) from low-quality, low-resolution images and videos. In one embodiment, these techniques enable high-quality super-resolution reconstruction (zooming) of video sequences.

In one embodiment, as a super-resolution technique, a higher resolution of media is created using warped transforms and adaptive thresholding. For warped transforms, the transform is warped to align with an edge, resulting in a sparse representation on directional edges and corners. The use of warped transforms results in increased sharpness along directional edges and corners when compared to prior art technologies. In one embodiment, warped transforms are selected, based on local edge direction, to render the highest quality output video. This selection may occur independently at every pixel or together for a block of pixels. Example block sizes are 2×2, 3×3, 4×4, 2×4, 4×2, etc.

The use of spatially adaptive thresholds enables modulation of the threshold according to the local signal statistics, which allows achieving very high quality with simply two iterations. This is far less that some prior art techniques that requires 10's of iterations to achieve similar quality.

FIG. 1A is a flow diagram of one embodiment of a process for performing quality enhancement/super-resolution reconstruction of media. The process is performed by processing logic that may comprise hardware (circuitry, dedicated logic, etc.), software (such as is run on a general purpose computer system or a dedicated machine), or a combination of both.

Referring to FIG. 1A, the process begins by processing logic receiving a first version of media (e.g., an image, a video, etc.) at a first resolution (processing block 130). After receiving the first version of the media, processing logic creates a second version of the media at a second resolution higher than or equal to the first resolution using at least one warped transform and adaptive thresholding (processing block 131). In one embodiment, the creation of the second version occurs as a result of an iterative process. In one embodiment, the iterative process only goes through two iterations.

In one embodiment, creating a second version of the media is performed by applying the at least one warped transform (e.g., a 2-D separable DCT) to a sub-frame to create transform coefficients. In one embodiment, the method includes selecting sub-frames adaptively in an image created by upsampling the first version of the media, such that applying the warped transform to a sub-frame to create transform coefficients comprises applying a transform to each of the selected sub-frames in the image. In one embodiment, the sub-frames are adaptively selected at each pixel in the image.

In one embodiment, the adaptive thresholding includes application of spatially adaptive thresholds, and creating the second version of the media comprises computing an adaptive threshold and thresholding transform coefficients with the adaptive thresholds.

In one embodiment, the super-resolution technique includes selecting a 2-D filter and upsampling the input image/video frame using the 2-D filter; selecting a sub-frame starting at any pixel of the upsampled frame and, at each pixel in the upsampled frame, forming a sub-frame and applying a pixel-adaptive warped transform on the sub-frame; deriving a detail-preserving adaptive threshold for each sub-frame and thresholding the transform coefficients of this sub-frame using hard thresholding (e.g., set to zero if magnitude of transform coefficients is less than the threshold) or other methods such as soft-thresholding, and applying an inverse transform to the thresholded transform coefficients to form processed sub-frames; performing a combination operation on the processed sub-frames to obtain a better estimate of the upsampled frame; and optionally performing a correction operation on the upsampled frame to achieve data consistency between the upsampled frame and input frame. These operations constitute one iteration and produce a super-resolution estimate. In one embodiment, the operations from sub-frame selection to correction are repeated to further refine the super-resolution estimate.

In one embodiment, the quality enhancement technique includes selecting a sub-frame starting at any pixel of the input image/video frame and, at each pixel in the input frame, forming a sub-frame and applying a pixel-adaptive warped transform on the sub-frame; deriving a detail-preserving adaptive threshold for each sub-frame and thresholding the transform coefficients of this sub-frame using hard thresholding (e.g., set to zero if magnitude of transform coefficients is less than the threshold) or other methods such as soft-thresholding, and applying an inverse transform to the thresholded transform coefficients to form processed sub-frames; performing a combination operation on the processed sub-frames to obtain an enhanced quality version of the input frame. These operations constitute one iteration and produce an enhanced quality estimate. In one embodiment, the entire process is repeated to further enhance the quality.

In one embodiment, the techniques described herein increase resolution by arbitrary factors. That is, the use of the super-resolution technique is not limited to integer multiples (e.g., 2×, 3×, etc.) for an increase in resolution. The super-resolution technique can increase resolution by any factor (e.g., 1.2×, 1.5×, 2.6×, etc.).

Figure 1B:
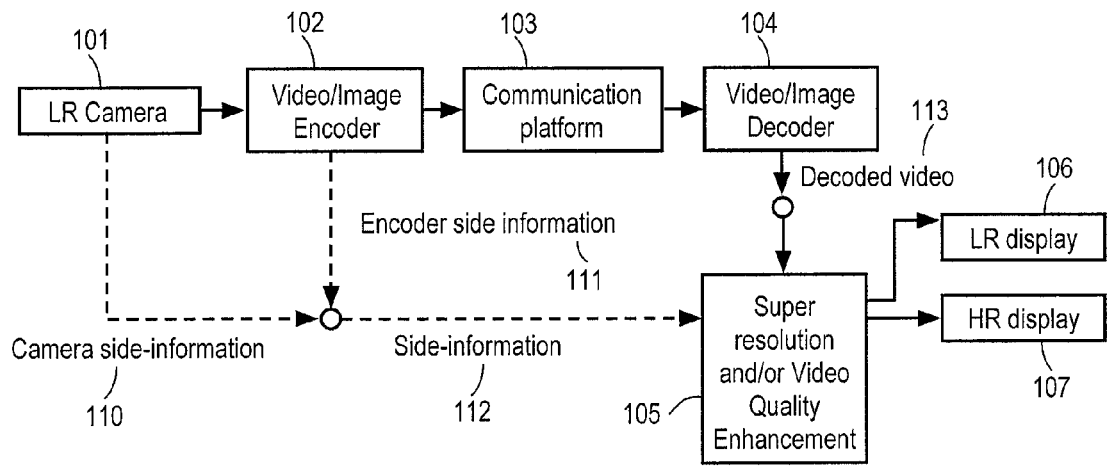
FIG. 1B is a block diagram of a system that illustrates an application scenario of one embodiment of the quality enhancement/super-resolution technique for compressed videos.

In one embodiment, the techniques described herein are applied to compressed/uncompressed image/video signals with or without the help of side-information. FIG. 1B is a block diagram of a system that illustrates an application scenario of one embodiment of the techniques described herein for compressed videos. Each of the blocks may comprise hardware (circuitry, dedicated logic, etc.), software (such as is run on a general purpose computer system or a dedicated machine), or a combination of both. Referring to FIG. 1B, low resolution (LR) camera 101 captures low-resolution image/video which is sent to a video/image encoder 102 for compression. The encoded video is transported in space and/or time using a communication platform 103 and sent to a video/image decoder 104 for decompression. The decoded video 113 is sent to super-resolution generator and/or video quality enhancer 105 for processing described herein. The output of super-resolution generator and/or video quality enhancer 105 is sent to a display such as LR display 106 or high resolution (HR) display 107. In one embodiment, LR camera 101 and encoder 102 send camera side-information 110 and encoder side-information 111 (shown as dashed lines), which are combined to form side-information 112, that can be used by super-resolution generator and/or video quality enhancer 105. The side-information may consist of any of the parameters (e.g., information about LR camera 101 (e.g., lens type), quantization step size, etc.) or choice/mode decisions for the quality enhancement and super-resolution techniques. For example, certain side-information may help determine which interpolation technique should be used. The side-information may include default settings. In this manner, the side-information allows the techniques described herein to be customized to different settings. In one embodiment, side-information is a vector of values, which represent the different choices. One simple way to signal the side-information is as follows: let OP denote the vector representing side-information. Each choice is signaled using two elements in the vector. For the nth choice, $$OP(2*n-1) = \begin{cases} 0, & \text{choice is not } signalled \\ 1, & \text{choice is } signalled \end{cases}$$

and OP(2*n)=value representing the choice. OP(2*n) needs to be set and is used only when OP(2*n−1)=1.

Figure 1C:
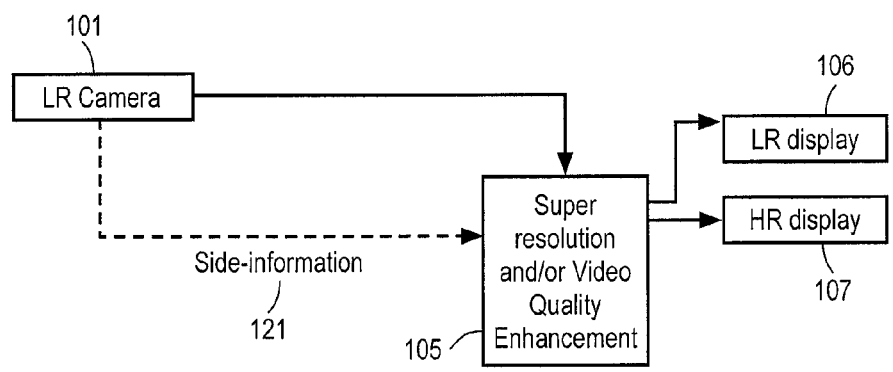
FIG. 1C is a block diagram of a system that illustrates an application scenario of one embodiment of the quality enhancement/super-resolution technique for uncompressed videos.

FIG. 1C is a block diagram of a system that illustrates an application scenario of one embodiment of the techniques described herein for uncompressed videos. Each of the blocks may comprise hardware (circuitry, dedicated logic, etc.), software (such as is run on a general purpose computer system or a dedicated machine), or a combination of both. Referring to FIG. 1C, LR camera 101 captures a low-resolution image/video which is sent to super-resolution generator and/or video quality enhancer 105 for processing described herein. The output of super-resolution generator and/or video quality enhancer 105 is sent to a display such as LR display 106 or HR display 107. In one embodiment, LR camera 101 sends side-information 121 (shown as dashed line) that can be used by super-resolution generator and/or video quality enhancer 105. The side-information may consist of any of the parameters (e.g., information about LR camera 101) or choice/mode decisions for the quality enhancement and super-resolution techniques as described above. As discussed above, the side-information allows the quality enhancement and super-resolution techniques to be customized to different settings.

One Embodiment of the Quality Enhancement/Super-Resolution Technique

Figure 2:
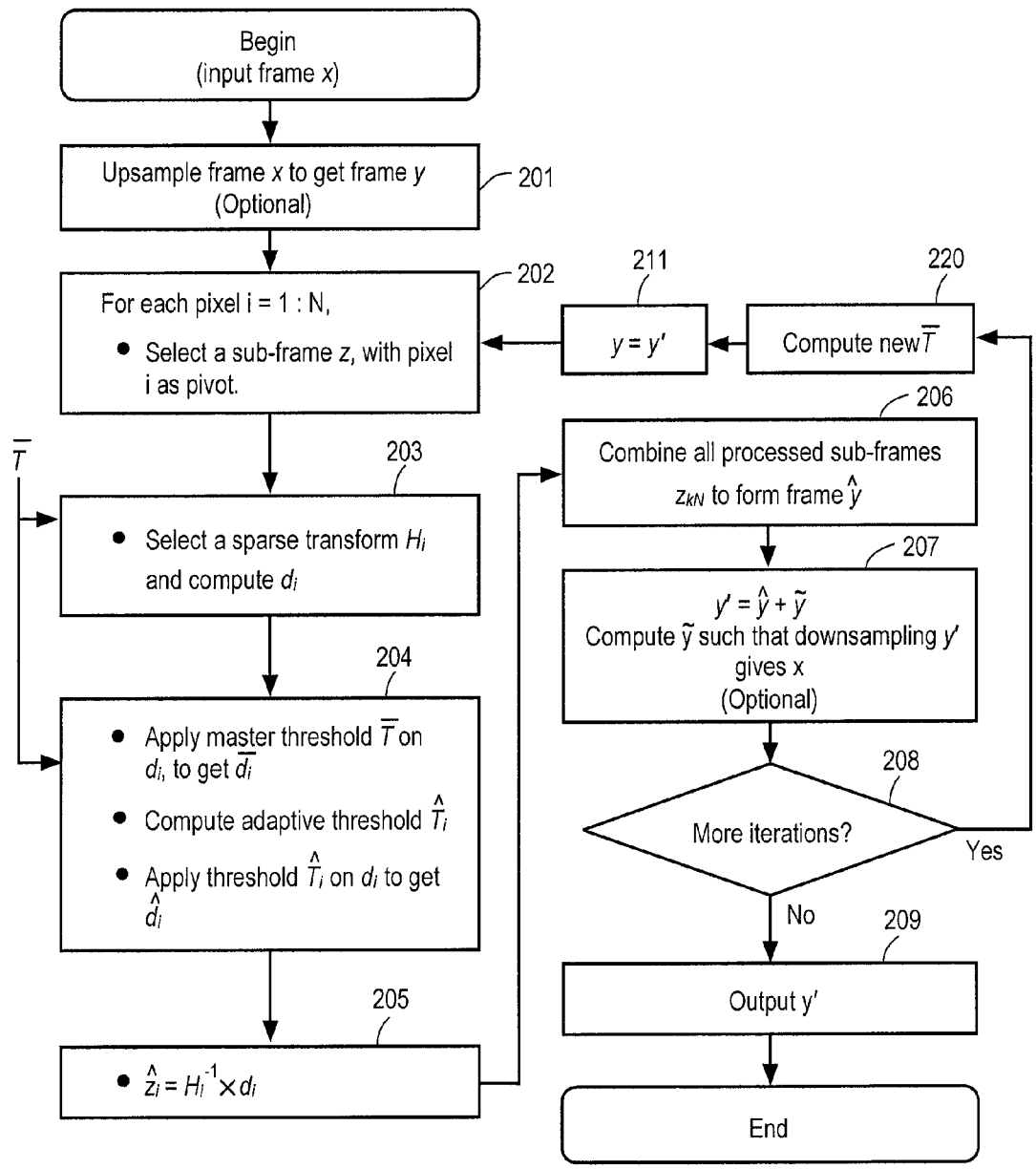
FIG. 2 is a flow diagram of one embodiment of a process for enhancing quality and/or increasing resolution.

FIG. 2 is a flow diagram of one embodiment of a process for performing quality enhancement and increasing resolution. The process is performed by processing logic that may comprise hardware (circuitry, dedicated logic, etc.), software (such as is run on a general purpose computer system or a dedicated machine), or a combination of both.

Referring to FIG. 2, x denotes the input image/video frame of low resolution (LR). In one embodiment, all image/video frames are represented as vectors by arranging the pixels in raster scan order. Alternatively, the data can be represented and/or stored as a vector, matrix, or in any other format.

Figure 3:
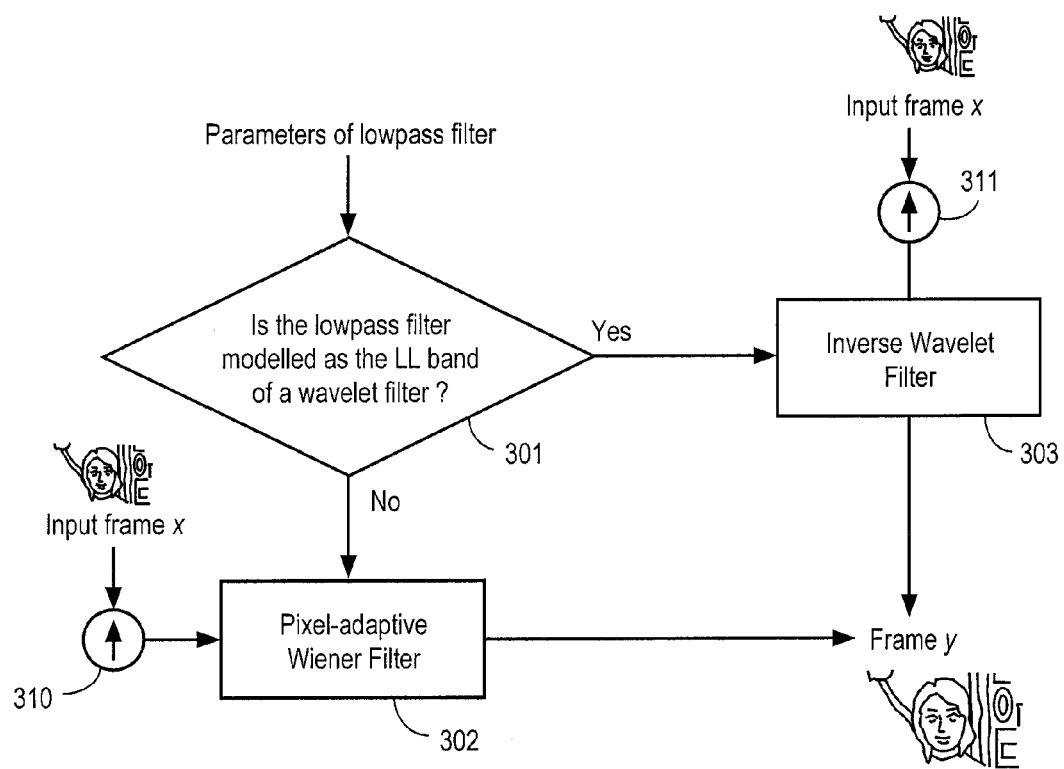
FIG. 3 is a flow diagram of one embodiment of an upsampling process.

Initially, processing logic upsamples input frame x to obtain upsampled frame y (processing block 201). The upsampling may be performed using an upsampling 2-D filter chosen to derive the upsampled version (y) of input frame x. FIG. 3 illustrates one embodiment of the upsampling process and will be described in more detail below. Note that this operation is optional when using the techniques described herein for quality enhancement. When this operation is not performed, frame y is set to be equal to frame x.

After upsampling the input frame x to obtain upsampled frame y, processing logic selects a subframe $z_i$, for each pixel i=1:N, with pixel i as a pivot (processing block 202). N represents the number of pixels in y. In this embodiment, a sub-frame is formed and processed for each pixel in the image. However, in another embodiment, the processing may be performed only on a selected subset of the pixels and not on all the pixels in the image. The subset may be predetermined or signaled as part of the side-information. FIGS. 13A-E illustrate examples of such subsets; other subsets may be used with the teachings described herein.

After selecting the sub-frame $z_i$ with pixel i as a pivot, processing logic selects a transform $H_i$ and computes coefficients $d_i$ by applying the transform $H_i$ on sub-frame $z_i$ (processing block 203). In one embodiment, the transform is a 2-D DCT. In another embodiment, the transform is a 2-D Hadamard transform. The master threshold is an input which can be used to select the transform.

After generating coefficients $d_i$, processing logic applies a master threshold $\overline{T}$ on coefficients $d_i$ to obtain $\overline{d}_i$, computes an adaptive threshold $\hat{T}_i$ and applies the adaptive threshold $\hat{T}_i$ on coefficients $d_i$ to adaptively threshold them to obtain $\hat{d}_i$ (processing block 204). Processing logic then applies an inverse transform $H_i^{-1}$ to thresholded coefficient $\hat{d}_i$ to obtain processed sub-frame $\hat{z}_i$ (processing block 205).

Next, processing logic combines all the processed sub-frames $\hat{z}_{1:N}$ corresponding to all pixels in a weighted fashion to form frame $\hat{y}$ (processing block 206). Then processing logic performs a data consistency step on frame $\hat{y}$ to get frame y' (processing block 207). The data consistency step is defined as:

$$y^1 = \hat{y} + \overline{y}$$

Processing logic computes $\tilde{y}$ such that the downsampling of y' gives input frame x. Note that this operation is optional when using the techniques described herein for quality enhancement. When this operation is not performed, frame y' is set to be equal to frame $\hat{y}$.

Afterwards, processing logic determines whether more iterations are needed (processing block 208). In one embodiment, the number of iterations is 2. The actual number of iterations can be signaled as part of the side-information. If so, the process transitions to processing block 220 where processing logic computes a new master threshold $\overline{T}$ and sets frame y equal to y' (processing block 211), and thereafter the process transitions to processing block 202. If processing logic determines that no more iterations are necessary, the process transitions to processing block 209 where processing logic outputs frame y' and the process ends. Note that in one embodiment, the linear interpolation operation of processing block 201 and data consistency operation of processing block 206 are optional. If the linear interpolation operation is not performed, (e.g., by disabling the linear interpolation module), the output resolution of the video/image is the same as the input resolution. Thus, under this embodiment, the quality of the video/image is enhanced, but there is no super-resolution.

The Upsampling Process

The upsampling filter can be chosen in a variety of ways to reverse the lowpass filtering caused either by a downsampling operation or due to physical limitations of the input device. Where the input device is a camera, these may include, but not limited to, native resolution, optical focus and shutter speed. In one embodiment, this lowpass filtering is modeled as an arbitrary finite-tap filter or as the LL band of a wavelet filter such as, for example, a Daubechies or Le Gall wavelet. In one embodiment, the lowpass filter is modeled as Daubechies 7/9 wavelet and the corresponding inverse wavelet filter is used to obtain frame y. Note that embodiments of the present invention are not limited to upsampling filters derived using these methods. Modules that can increase the resolution of an image/video can be used, including, but not limited to, any upsampling filters such as bilinear, bicubic, and H.264 interpolation filters.

The parameters that define the lowpass filter and/or the upsampling filter can be included in the side-information (e.g., side information 112, side information 121, etc.).

In one embodiment, when the lowpass filter is modeled as a wavelet filter (LL band), the upsampling filter is the inverse wavelet filter, and when the lowpass filter is modeled as an arbitrary finite-tap filter, the upsampling filter is the Wiener filter that is optimal in the MSE between an original frame and the frame obtained by passing the original frame through the lowpass and upsampling filters consecutively. In one embodiment, the optimal filter depends on the original frame and is signaled independently for each pixel using side-information.

In one embodiment, the input frame x is upsampled and filtered using either an inverse wavelet filter or a pixel adaptive Wiener filter to obtain frame y. FIG. 3 is a flow diagram of one embodiment of an upsampling process. The process is performed by processing logic that may comprise hardware (circuitry, dedicated logic, etc.), software (such as is run on a general purpose computer system or a dedicated machine), or a combination of both.

Referring to FIG. 3, using the parameters of a lowpass filter, processing logic determines whether the low pass filter is modeled as the LL band of the wavelet filter (processing block 301). This allows the processing logic to classify the low pass filter as a wavelet filter or not. If processing logic determines that the lowpass filter is a wavelet filter, processing logic upsamples the input frame x with upsampler 311 and applies an inverse wavelet filter to input frame x to obtain frame y (processing block 303). If processing logic determines the lowpass filter is not a wavelet filter, processing logic upsamples the input frame x with upsampler 310 and applies a pixel-adaptive Wiener filter to input frame x to obtain frame y (processing block 302).

The Sub-Frame Selection Process

Figure 5:
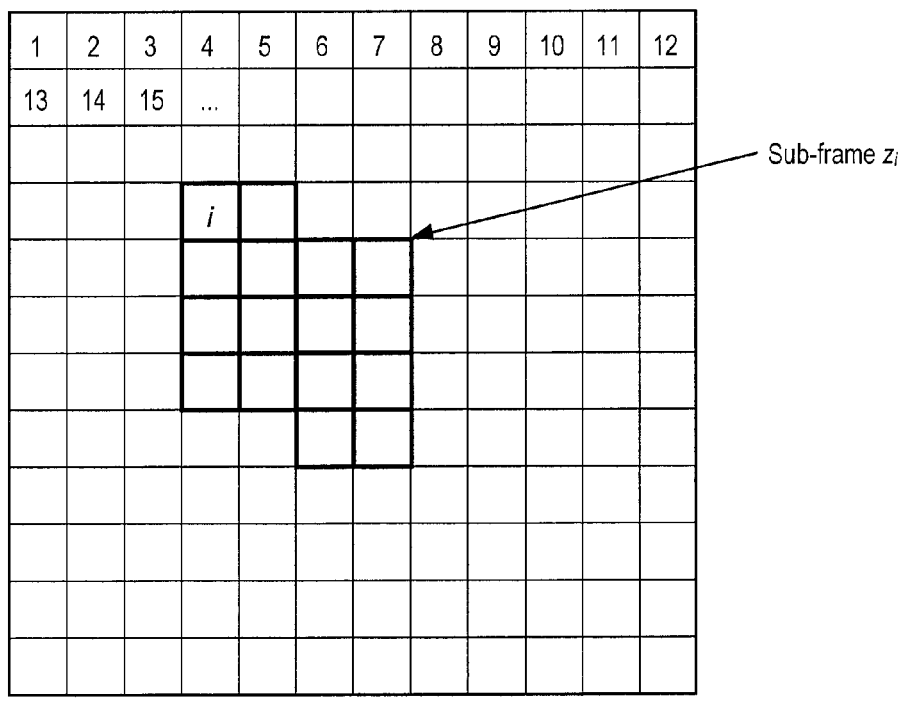
FIG. 5 shows an example sub-frame $z_i$ at pixel i when pixels are numbered in raster-scan order.

After the upsampling process is complete and frame y has been obtained, the sub-frame selection process of processing block 202 of FIG. 2 begins. A sub-frame type S is defined as an $M^2 \times 1$ integer-valued vector. For purposes herein, M can be any integer greater than zero. $\{S^1, S^2, S^3, \ldots\}$ is a library of sub-frame types. For each selected pixel i in frame y where pixels are numbered in raster-scan order, a sub-frame type $s_i$ is selected from the library and a vector $p_i$ is formed as $p_i = s_i + i \times \overline{1}$, where $\overline{1}$ is an $M^2 \times 1$ vector with all elements equal to 1. In one embodiment, for pixels that are not selected, $p_i$ is a vector of zeros. An $M^2 \times 1$ vector $z_i$ called a sub-frame is formed with pixel values of frame y at locations corresponding to elements of $p_i$. Pixel i is called the pivot for sub-frame $z_i$. FIG. 5 shows an example sub-frame $z_i$ at pixel i when pixels are numbered in raster-scan order. Referring to FIG. 5, the raster-scan ordering of pixels occurs by numbering pixels starting from "1" in that order. A sub-frame is shown pivoted at pixel i. A sub-frame is organized into M vectors called warped rows. The first warped row has the sub-frame elements 1 to M in that order; the second warped row has the elements (M+1) to 2M; and so on.

Figure 4K:
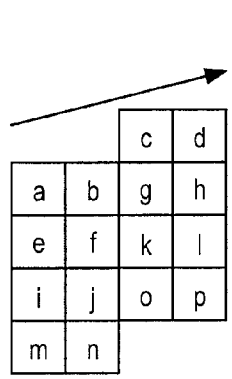
Figure 4L:
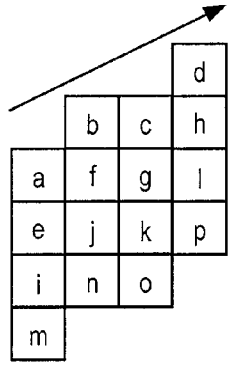
Figure 4M:
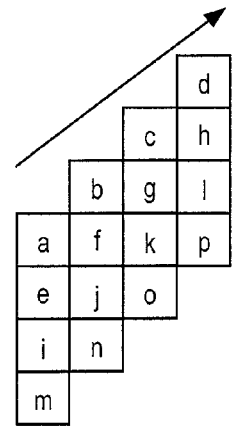

In one embodiment, M is equal to 4 and the library of sub-frame types correspond to a set of masks illustrated in FIGS. 4A-4M. Referring to FIGS. 4A-4M, with this library of sub-frames, the masks correspond to different directions as shown with arrows. The mask in FIG. 4A is referred to herein as a regular mask because it corresponds to the regular horizontal or vertical directions. The other masks are called directional masks since they correspond to non-trivial directions. The differential-position ($\Omega$) of a pixel ('a' to 'p') in a mask is defined as $\Omega = C_C + W \times C_R$, where W is the width of frame y. $C_C$ is the number of columns one needs to move horizontally to the right starting from the column of pixel 'a' to get to the column of the current pixel of interest. $C_R$ is the number of rows one needs to move vertically down starting from the row of pixel 'a' to get to the row of the current pixel of interest. For example, in the case of the mask in FIG. 4H, pixel 'c' has $C_C = -1$ and $C_R = 2$. The sub-frame type corresponding to a mask is the vector containing the differential-positions of pixels in that mask ordered from 'a' to 'p'.

In one embodiment, the choice of the sub-frame type for a pixel is made by choosing the sub-frame type corresponding to the regular mask always. In another embodiment, the choice of the sub-frame type for a pixel is made, for each selected pixel, (1) by evaluating, for each sub-frame type, a 2-D DCT over the sub-frame formed, and (2) by choosing, for a given threshold T, the sub-frame type that minimizes the number of non-zero transform coefficients with magnitude greater than T. In yet another embodiment, the choice of the sub-frame type for a pixel is made by choosing, for each selected pixel, the sub-frame type that minimizes the warped row variance of pixel values averaged over all warped rows. In still another embodiment, the choice of the sub-frame type for a pixel is made by having, for a block of K×L pixels, each pixel vote for a sub-frame type (based on the sub-frame type that minimizes the warped row variance of pixel values averaged over all warped rows) and choosing the sub-frame type with the most votes for all the pixels in the K×L block, where K and L can be any integers greater than 0. In one embodiment, K and L are all set to be 4. In still another embodiment, the choice of the sub-frame type for a pixel is made by forming, for each pixel, a block of K×L pixels and choosing a sub-frame type by using the preceding voting scheme on this block. In each case, the chosen sub-frame type is used for the current pixel. Thus, by using one of these measured statistics for each mask, the selection of a subframe is performed.

Note that masks other than those in FIGS. 4A-4M may be used.

Figure 6:
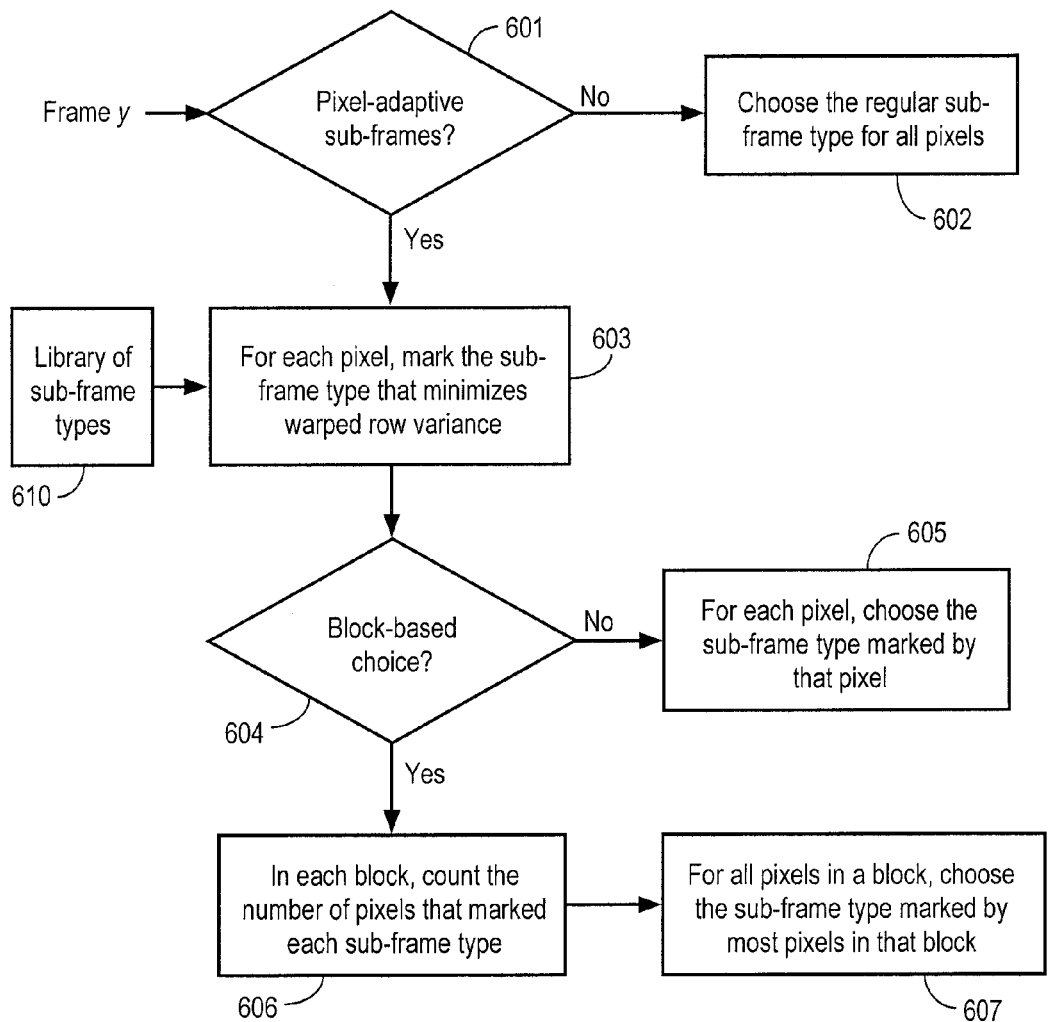
FIG. 6 is a flow diagram of one embodiment of sub-frame selection processing.

FIG. 6 is a flow diagram of one embodiment of sub-frame selection processing. The process is performed by processing logic that may comprise hardware (circuitry, dedicated logic, etc.), software (such as is run on a general purpose computer system or a dedicated machine), or a combination of both.

Referring to FIG. 6, the process begins by processing logic receiving frame y and determining whether the sub-frames are pixel-adaptive (processing block 601). If the sub-frames are not pixel-adaptive, processing logic chooses the regular sub-frame type for all pixels (processing block 602). If the sub-frames of sub-frame y are pixel adaptive, processing logic, for each pixel, marks the sub-frame type that minimizes the warped row variance (processing block 603). This is done using the library of sub-frame types (620) as described above. Thus, for each pixel, the sub-frame type that minimizes the warped row variance among the library of sub-frame types is marked.

Next, processing logic determines whether the choice is block-based (processing block 604). If processing logic determines the choice is block-based, processing logic counts the number of pixels that marked each sub-frame type in each block (processing block 606) and, for all pixels in a block, processing logic chooses the sub-frame type marked by most pixels in that block (processing block 607). In other words, if the choice is block-based, the sub-frame type marked by most pixels in a block is chosen for all pixels in that block. If processing logic determines the choice is not block-based, processing logic chooses, for each pixel, the sub-frame type marked by that pixel (processing block 605). In other words, each pixel chooses the sub-frame type marked by itself.

The choice of the sub-frame types for each pixel can be part of the side-information.

Transform Selection and Application

After selecting the sub-frame $z_i$, the sub-frame $z_i$ is transformed into $d_i$ using a pixel-adaptive warped transform $H_i$. The transform is referred to herein as 'warped' because the support of the transform basis has warped to match the sub-frame shape. The transform is referred to as pixel-adaptive because sub-frames pivoted at different pixels can use different transforms in addition to the fact that the choice of sub-frame type can vary from pixel to pixel. In one embodiment, the transform $H_i$ is chosen from a library of transforms such as, for example, a separable 2-D Hadamard, a separable DCT, a non-separable DCT, 2-D Gabor wavelets, Steerable pyramids, 2-D directional wavelets, Curvelets and Contourlets. It should be noted that a separable transform becomes non-separable after it is warped. The choice can be fixed apriori or adaptive to the different sub-frames pivoted at different pixels. In one embodiment, in the adaptive case, the chosen transform is the one that has the least number of coefficients with absolute value greater than a master threshold T. In one embodiment, the choice of the transforms is part of the side-information. A flow diagram of one embodiment of a transform selection process for a sub-frame is illustrated in FIG. 7.

Figure 7:
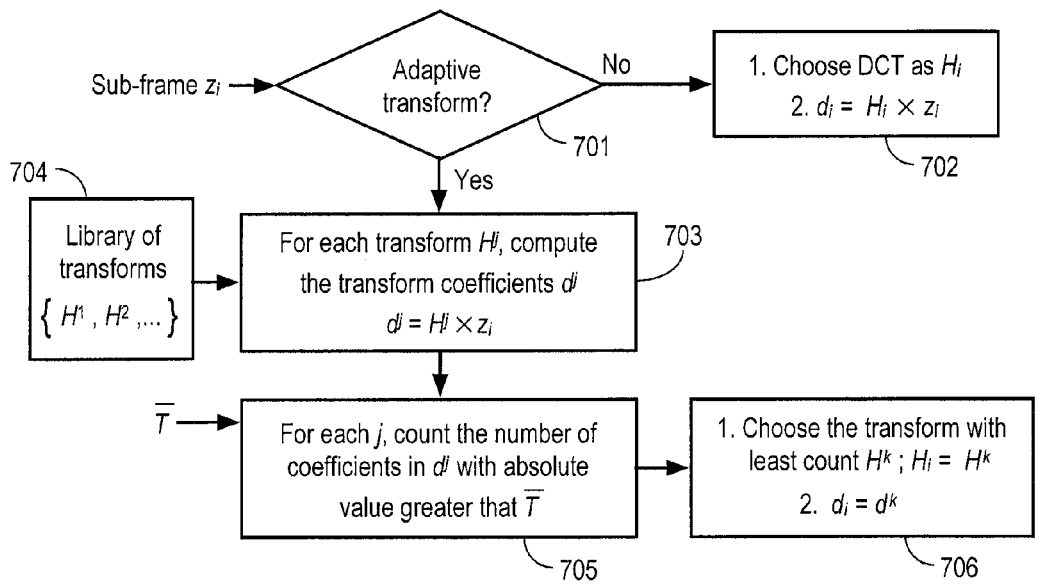
FIG. 7 is a flow diagram of one embodiment of a transform selection process for a sub-frame.

Referring to FIG. 7, the process is performed by processing logic that may comprise hardware (circuitry, dedicated logic, etc.), software (such as is run on a general purpose computer system or a dedicated machine), or a combination of both. The process begins by processing logic testing whether the transform is pixel-adaptive (processing block 701). This test may be performed by referring to a list. In one embodiment, the list can be such that the transform is non-adaptive. In another embodiment, the list can be signaled as part of side-information. If processing logic determines that the transform is not pixel-adaptive, processing logic selects a 2-D orthonormal separable DCT for use as the transform and generates the transform coefficients $d_i$ by applying the transform to the sub-frame $z_i$ (processing block 702).

If processing logic determines the transform is pixel-adaptive, then, for each transform $H^j$ in the library of transforms $\{H^1, H^2, \ldots\}$ (processing block 703), processing logic computes the transform coefficients $d^j$ using the formula:

$$d^j = H^j \times z_i.$$

The transform coefficients $d^j$ correspond to the transform $H^j$.

Next, for each j, processing logic counts the number of coefficients in $d^j$ with an absolute value greater than a master threshold T (processing block 705) and chooses the transform from the library of transforms with the least count $H^k$, sets the transform $H_i$ equal to the transform corresponding to the least count ($H^k$), and then sets the coefficients $d_i$ equal to the transform coefficients $d^k$ (processing block 706).

Thresholding

As part of the thresholding process that occurs after selecting the transform, in one embodiment, a detail-preserving adaptive threshold $\hat{T}_i$ is applied on the transform coefficients $d_i$ to obtain $\hat{d}_i$. The threshold $\hat{T}_i$ is referred to herein as detail-preserving since its value adapts such that high-frequency detail in the image/video frame is preserved. The transform coefficients $d_i$ are also thresholded using a master threshold T to obtain $\bar{d}_i$. The thresholding operation can be done in a variety of ways. In one embodiment, the thresholding operation is performed using hard thresholding. In another embodiment, the thresholding operation is performed using soft thresholding. The hard thresholding operation is defined as $$HT(x) = \begin{cases} x, & |x| \geq T \\ 0 & |x| < T \end{cases},$$

where T is the threshold used. Similarly, the soft thresholding operation with T as the threshold is defined as $$ST(x) = \begin{cases} x - T, x \geq T \\ x - T, x \leq -T \\ 0, |x| < T \end{cases}.$$

The results of thresholding may be compared to the energy lost. If too much of the signal energy is lost, the threshold may be too high for this particular area and, thus, might have to be reduced.

In alternative embodiments, the threshold $\hat{T}_i$ is computed in one of the following ways:

$$\hat{T}_i = \overline{T}$$

$$\hat{T}_i = f\left(\overline{T}, \sum_{j=1}^{N} \|d_j - \overline{d}_j\|^2\right),$$

where $f()$ represents a function $$\hat{T}_i = f(\overline{T}, \|d_i - \overline{d}_i\|^2),$$

where $f()$ represents a function $$\hat{T}_i = \overline{T} \times f(\|d_i - \overline{d}_i\|^2).$$

Figure 9:
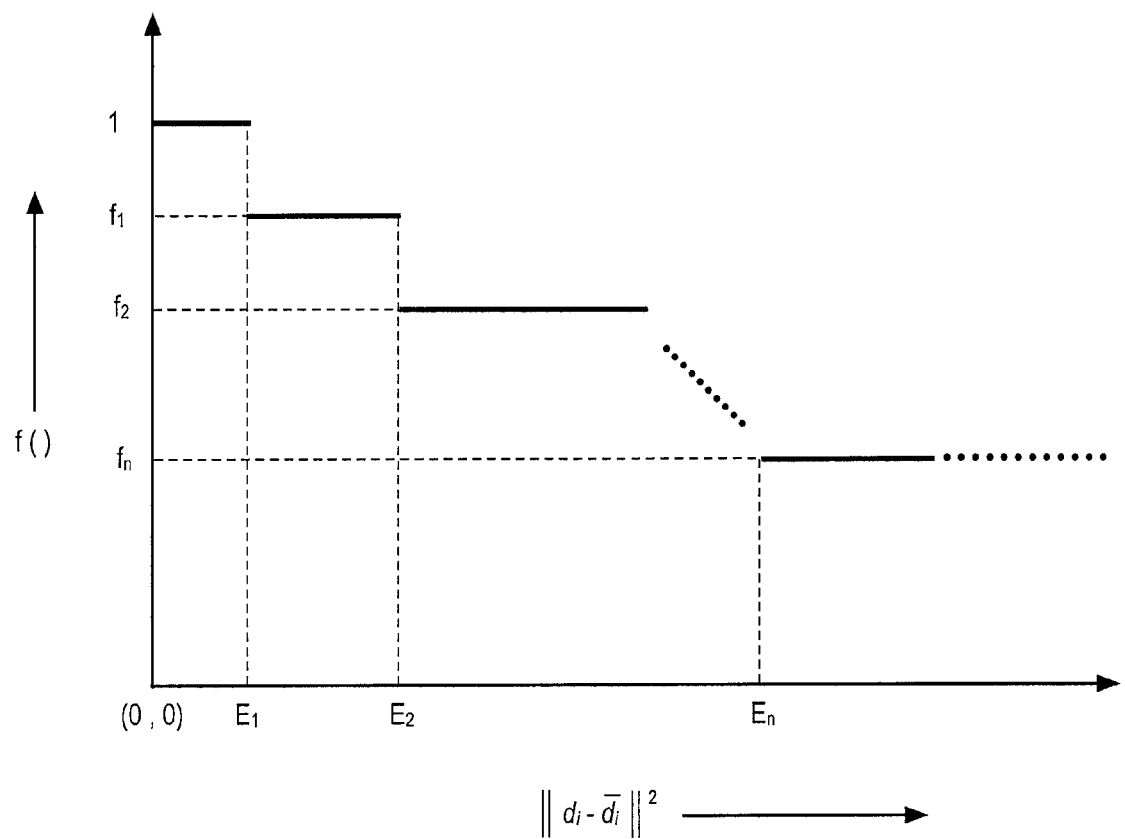
FIG. 9 illustrates a monotonic decreasing stair-case function.

The function f( ) is a monotonic decreasing stair-case function as illustrated in FIG. 9. In one embodiment, the function used is a lookup table, which can be part of the side-information. Referring to FIG. 9, the shape of a monotonic decreasing staircase function used in the adaptive thresholding process is shown. The parameters $(f_1, f_2, \ldots, f_n)$ and $(E_1, E_2, \ldots, E_n)$ completely define the function. The step positions of the function $(f_1, f_2, \ldots, f_n$ and $E_1, E_2, \ldots, E_n)$ are tuned on a training set to achieve a local optimum in reconstructed image/video quality.

Perform a search on possible values for $\overline{T}_i$ to minimize the number of non-zero elements in $\overline{d}_i$ such that $\|d_i - \overline{d}_i\|^2 < E_{local}$, where local refers to a local portion of the image, as opposed to the entire image. $E_{local}$ can be part of the side-information or default values may be used. This can be viewed as a setting for the algorithm. In one embodiment, a default value can be obtained by tuning on a training set and choosing the value that achieves a local optimum in reconstructed image/video quality.

Perform a joint search on possible values for $(\hat{T}_1, \hat{T}_2, \ldots, \hat{T}_N)$ to minimize the total number of non-zero elements in $\hat{d}_k$ summed over all $k \in \{1, 2, \ldots, N\}$ such that $$\sum_{j=1}^{N} \|d_j - \hat{d}_j\|^2 < E_{global},$$

where global refers to the image as a whole. $E_{global}$ can be part of the side-information or default values may be used. This can be viewed as a setting for the algorithm. In one embodiment, a default value can be obtained by tuning on a training set and choosing the value that achieves a local optimum in reconstructed image/video quality. In one embodiment, the option $$\hat{T}_i = \overline{T} \times f(\|d_i - \overline{d}_i\|^2)$$

is used and hard thresholding is used for the thresholding operation. The different parameters in the thresholding process can be part of the side-information.

Figure 8:
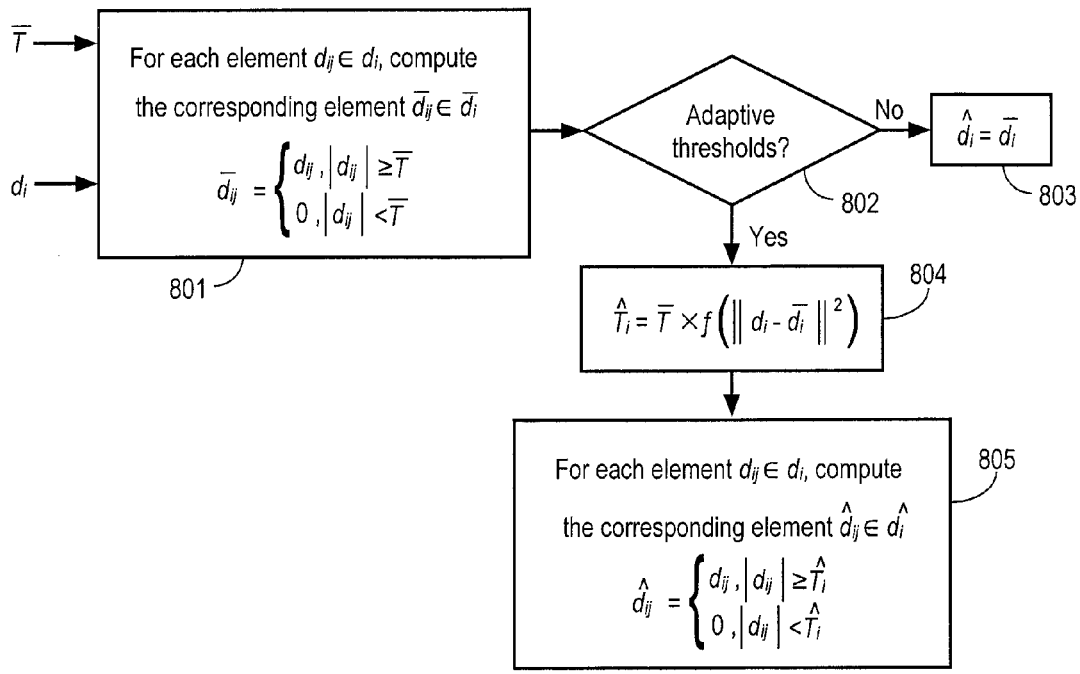
FIG. 8 is a flow diagram of one embodiment of a thresholding process for thresholding transform coefficients.

FIG. 8 is a flow diagram of one embodiment of a thresholding process for thresholding transform coefficients $d_i$. The process is performed by processing logic that may comprise hardware (circuitry, dedicated logic, etc.), software (such as is run on a general purpose computer system or a dedicated machine), or a combination of both.

Referring to FIG. 8, the process begins using a master threshold $\overline{T}$ and coefficients $d_i$ as inputs, and processing logic, for each element $d_{ij} \in d_i$, computing the corresponding element $\overline{d}_{ij} \in \overline{d}_i$ according to the following equation:

$$\overline{d}_{ij} = \begin{cases} d_{ij}, |d_{ij}| \geq \overline{T} \\ 0, |d_{ij}| < \overline{T} \end{cases}$$

(processing block 801). In this manner, processing logic sets to zero all coefficients with absolute values less than the master threshold $\overline{T}$ and these coefficients are stored as $\overline{d}_i$.

Next, processing logic determines whether the thresholds are adaptive (processing block 802). This test may be performed by referring to a list. In one embodiment, the list can be such that the thresholds are non-adaptive. In another embodiment, the list can be signaled as part of side-information. If processing logic determines that adaptive thresholds are not used, processing logic copies the output coefficient $\overline{d}_i$ directly from $\overline{d}_i$ (processing block 803). If processing logic determines that adaptive thresholds are used, processing logic computes the adaptive threshold $\hat{T}_i$ as a product of master threshold $\overline{T}$ and a monotonically decreasing function of absolute value $\|d_i - \overline{d}_i\|^2$ (the L-2 norm between $d_i$ and $\overline{d}_i$) as follows:

$$\hat{T}_i = \overline{T} \times f(\|d_i - \overline{d}_i\|^2)$$

(processing block 804). Then processing logic computes, for each element, the corresponding element $\hat{d}_{ij} \in \hat{d}_i$ according to the formula:

$$\hat{d}_{ij} = \begin{cases} d_{ij}, |d_{ij}| \geq \hat{T}_1 \\ 0, |d_{ij}| < \hat{T}_1 \end{cases}$$

(processing block 805). Thus, in this manner, all coefficients $d_{ij}$ with absolute values less than $\hat{T}_1$ are set to zero and stored as $\hat{d}_{ij}$.

Combining Sub-frames

After applying the inverse transform to the thresholded coefficients, all of the processed sub-frames are combined in a weighted fashion to form frame $\hat{y}$. In one embodiment, a weight $w_i$ is computed for each processed sub-frame $\hat{z}_i$. In alternative embodiments, this is computed in one of the following ways:

$w_i = f(T, \hat{T}_i)$, where f( ) represents a function. An example of such a function is $$\frac{\hat{T}_i}{T}$$

$w_i = f(d_i, \hat{d}_i)$, where f( ) represents a function.

MSE option:

$$w_i = \begin{cases} \dfrac{1}{\|d_i - \hat{d}_i\|^2}, & \|d_i - \hat{d}_i\|^2 > e_{min} \\ \dfrac{1}{e_{min}}, & \|d_i - \hat{d}_i\|^2 \le e_{min} \end{cases}$$

where $e_{min}$ is a constant.

L-p Norm option (p≥0):

$$w_i = \begin{cases} \dfrac{1}{\|\hat{d}_i\|_p}, & \|\hat{d}_i\|_p > n_{min} \\ \dfrac{1}{n_{min}}, & \|\hat{d}_i\|_p \le n_{min} \end{cases}$$

where $n_{min}$ is a constant.

$$w_i = g(\|\hat{d}_i\|_p),$$

where p≥0 and the function g( ) is a monotonic decreasing stair-case function similar to the function f( ) illustrated in FIG. 9. The step positions of the function ($f_1, f_2, \ldots, f_n$ and $E_1, E_2, \ldots, E_n$) are tuned on a training set to achieve a local optimum in reconstructed image/video quality.

$$w_i = g(\|d_i - \hat{d}_i\|_p),$$

where p≥0 and the function g( ) is a monotonic decreasing stair-case function similar to the function f( ) illustrated in FIG. 9. The step positions of the function ($f_1, f_2, \ldots, f_n$ and $E_1, E_2, \ldots, E_n$) are tuned on a training set to achieve a local optimum in reconstructed image/video quality.

The calculated weight $w_i$ can be part of the side-information.

The processed sub-frames $\hat{z}_{1:N}$ (corresponding to all pixels) are combined together to form $\hat{y}$ in a weighted manner. One embodiment of this process is described for $\hat{y}_j$, which is the value of the $j^{th}$ pixel.

1. Set $\hat{y}_j=0$ and $n_j=0$, where $n_j$ is the normalization coefficient for $j^{th}$ pixel.
2. For each processed sub-frame $\hat{z}_i$
   a. If pixel j is part of $p_i$
      i. k=index of pixel j in $p_i$.
      ii. $\hat{y}_j = \hat{y}_j + w_i \times \hat{z}_{ik}$, where $\hat{z}_{ik}$ is the value of pixel j in the processed sub-frame $\hat{z}_i$.
      iii. $n_j = n_j + w_i$

3.

$$\hat{y}_j = \frac{\hat{y}_j}{n_j}$$

Figure 10:
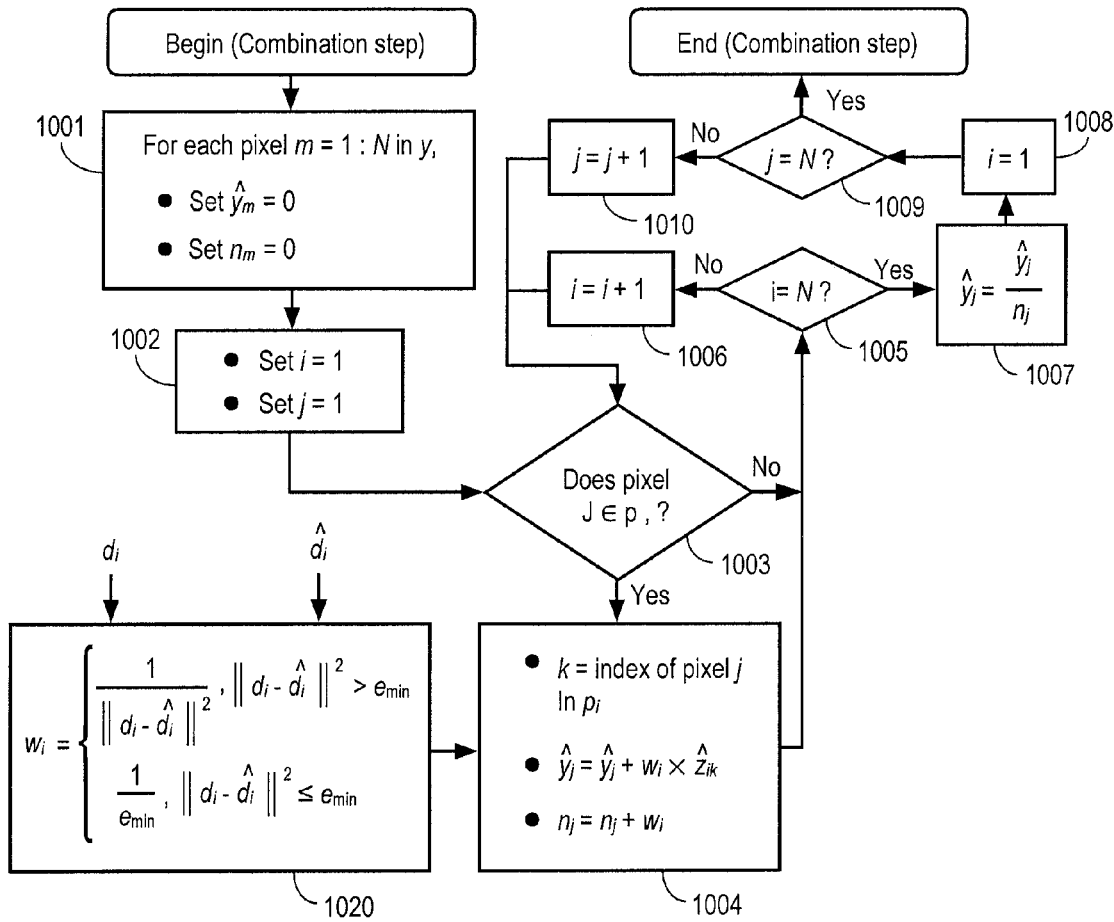
FIG. 10 is a flow diagram of one embodiment of a process for combining sub-frames to form a frame.

FIG. 10 is a flow diagram of one embodiment of a process for combining all processed sub-frames to form frame ŷ. The process is performed by processing logic that may comprise hardware (circuitry, dedicated logic, etc.), software (such as is run on a general purpose computer system or a dedicated machine), or a combination of both.

Referring to FIG. 10, the process begins by setting its value $\hat{y}_m$ and its normalizing factor $n_m$ to zero for each pixel m=1:N in frame y (processing block 1001). Next, processing logic initializes the pixel index j and the sub-frame index i to one (processing block 1002).

After initialization, processing logic determines whether pixel j∈$p_i$ (processing block 1003). If it is, the process transitions to processing block 1004. If not, process transitions to processing block 1005.

At processing block 1004, in one embodiment, processing logic updates $\hat{y}_j$ and $n_j$ using $\hat{z}_{ik}$, the value of the pixel j in $\hat{z}_i$, and using waiting factor $w_i$ calculated using $d_i$ and $\hat{d}_i$. In one embodiment, the waiting factor is calculated according to the following:

$$w_i = \begin{cases} \dfrac{1}{\|d_i - \hat{d}_i\|^2}, & \|d_i - \hat{d}_i\|^2 > e_{min} \\ \dfrac{1}{e_{min}}, & \|d_i - \hat{d}_i\|^2 \le e_{min} \end{cases}$$

In processing block 1004, k is equal to the index of pixel j in $p_i$. In one embodiment, processing logic updates $\hat{y}_j$ and $n_j$ based on the following equation:

$$\hat{y}_j = \hat{y}_j + w_i \times \hat{z}_{ik}$$

$$n_j = n_j + w_i$$

After processing logic updates $\hat{y}_j$ and $n_j$, the process transitions to processing block 1005.

At processing block 1005, processing logic checks whether the index i=N, the total number of pixels in the frame. If so, the process transitions to processing block 1007. If not, the process transitions to processing block 1006. At processing block 1006, the index is incremented by one and the process transitions to processing block 1003.

At processing block 1007, processing logic updates $\hat{y}_j$ according to the following equation:

$$\hat{y}_j = \frac{\hat{y}_j}{n_j}.$$

After updating $\hat{y}_j$, processing logic sets the index i equal to 1 (processing block 1008) and checks whether the index j is equal to N (processing block 1009). If it is, the process ends. If not, the process transitions to processing block 1010 where the index j is incremented by one. After incrementing the index j by one, the process transitions to processing block 1003.

In the case of video, in one embodiment, the combination operation also includes an estimate based on the previous frame to emulate an autoregressive process. This ensures smooth video playback in regions with a lot high-frequency detail. This is mathematically represented as:

$$\hat{y} = \alpha \hat{y}_{prev} + (1-\alpha)\hat{y},$$

where $\alpha$ represents the autoregression coefficient. In one embodiment, $\alpha = 0.5$. In another embodiment, $\alpha$ can be part of the side-information and $\hat{y}_{prev}$ is the estimate of the previous frame corrected for scene motion between current frame and previous frame.

The Data Consistency Operation

The data consistency operation preserves the relevant signal content such that the original low-resolution image/video is recoverable from the high-resolution image/video. Thus, the data of the high-resolution image/video produced by the super-resolution technique is consistent with the low-resolution image/video.

In one embodiment, the frame y' is set equal to the frame ŷ and y' is considered the enhanced quality estimate or the super-resolution estimate (if the data consistency step is not used).

In another embodiment, the frame ŷ is processed by a data consistency step that outputs y', which is considered the super-resolution estimate. This operation ensures that the downsampling of y' using the modeled lowpass filter results in the input image/video frame x.

In one embodiment, the modeled lowpass filter is used to downsample ŷ to get $\hat{y}_d$. A difference frame $\tilde{y}_d$ is calculated using $$\tilde{y}_d = x - \hat{y}_d.$$

An upsampled version, $\tilde{y}$, is formed using the same process that produced y from x. The super-resolution estimate is formed as $$y' = \hat{y} + \tilde{y}.$$

Figure 11:
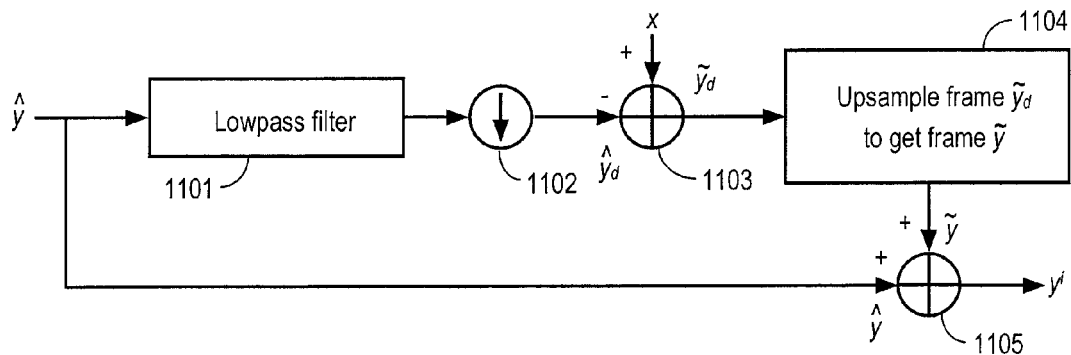
FIG. 11 is a dataflow diagram of one embodiment of a data consistency operation.

FIG. 11 is a dataflow diagram of one embodiment of a data consistency operation. The blocks in FIG. 11 and their associated operations may comprise hardware (circuitry, dedicated logic, etc.), software (such as is run on a general purpose computer system or a dedicated machine), or a combination of both. Referring to FIG. 11, modeled lowpass filter 1101 filters the combined frame ŷ and downsampler 1102 downsamples the filtered output to form $\hat{y}_d$. A substractor 1103 subtracts $\hat{y}_d$ from input frame x to form a difference frame ($\tilde{y}_d$) at low resolution. Upsampler 1104 upsamples the difference frame $\tilde{y}_d$ using the process shown in FIG. 3 to obtain the upsampled version $\tilde{y}$. Adder 1105 adds the upsampled version $\tilde{y}$ to ŷ to form the super-resolution estimate y'.

Iterations

The enhanced quality/super-resolution estimate y' can be further refined by iterating over the entire process as illustrated in FIG. 2. The number of iterations ($N_1$) can be any integer greater than zero. The master threshold T is updated and the frame y' is copied into frame y. The master threshold can be any positive real value and can be updated in any of the following ways:

Linear option: $\overline{T} = \min(\overline{T} - \Delta A, 0)$, where $\Delta$ is a constant chosen apriori.

MSE option:

$$T = f\left(T, \sum_{j=1}^{N} \|d_j - \hat{d}_j\|^2\right),$$

where f( ) represents a function.

In one embodiment, the number of iterations ($N_1$) and the master threshold T for each of the iterations are included as part of the side-information.

In one embodiment, the number of iterations ($N_1$) is an integer between 1 and 4 and the master threshold is set at 100 for the first iteration and $$\Delta = \frac{100}{N_I}.$$

For example, if $N_1$ is equal to 2, the master thresholds for the two iterations are 100 and 50. Thus, in one embodiment, the number of thresholds is two and the master threshold is reduced in the second iteration.

Applications

The quality enhancement and super-resolution techniques have diverse applications in the processing, coding and display of images and/or video. Generally, these techniques can be used to enhance low-quality, low-resolution images and/or videos to high-quality, low-/high-resolution.

More specifically, with respect to broadcast video, broadcast programming aimed at devices having displays that only handle low-resolution videos (e.g., mobile phones) can also be used in stationary environments where high-resolution displays such as televisions are available. Also for phones with high-resolution displays, content available at low resolution, such as that for mobile phones having displays that only handle low-resolution videos, can be processed to match the higher resolution of the phone's high-resolution display. In one embodiment, a low-resolution video signal is broadcast to one or more mobile phones, which displays the low-resolution video signal. The mobile phone includes the functionality described herein to convert the low-resolution video to high-resolution video and display the high-resolution video itself and/or send the high resolution video to a high resolution display, such as a television. In one embodiment, the mobile phone transmits the high-resolution video to a television using local wireless transmission. In another embodiment, the cell phone sends the low-resolution video to a docking station that uses the techniques described herein to convert the low-resolution video to high-resolution video and transmit them to the high resolution display.

Another application of the techniques described herein is for video quality enhancement in a network. For example, videos captured by a mobile phone camera are of low-quality and low-resolution. The techniques described can be used in a network to enhance these videos to high-quality and high-resolution. The captured videos can be uploaded, via a network, to a server or other processor-based system for enhancement using the techniques disclosed herein (e.g., reducing compression artifacts, increasing resolution, etc.), and thereafter, users can download the enhanced videos from the network.

Another application is fractional-pel motion compensation in video coding which provides significant gains in compression efficiency. To do fractional-pel motion compensation, the input image/video should be interpolated to get the intensity values at fractional pixel locations. The super-resolution technique can be used to do the interpolation.

Similarly, images taken by mobile phone and shared through a network are often not of good quality. When sharing, the images at a low quality, low resolution are sent through the network, the bandwidth usage is reduced in comparison to sending such images at a higher quality and/or resolution level. Then, after transmission, the quality of these images can be improved using the techniques described herein to achieve "print" quality or better, particularly where a user wishes to print one such image. Also, the quality of video conferencing can be improved by using the techniques described herein. More specifically, a terminal being used to communicate as one of the video conferencing participants can be equipped with the functionality described herein and thus is able to show the conferencing video at a higher zoom level and/or with improved quality.

The video quality enhancement technique can also be used as a loop filter in a video decoder to improve compression efficiency.

Examples of Advantages

Embodiments of the invention achieve high quality of performance compared to related art. Embodiments of the invention are applicable to a wide variety of image/video content with smooth regions, texture and edges in all directions. Embodiments of the invention are not limited to regions with horizontal or vertical edges. Embodiments of the invention adapt its parameters based on local pixel statistics. Embodiments of the invention can use side-information from the image/video source whenever possible. Embodiments of the invention needs less iteration and incurs lower computational complexity.

An Example of a Computer System

Figure 12:
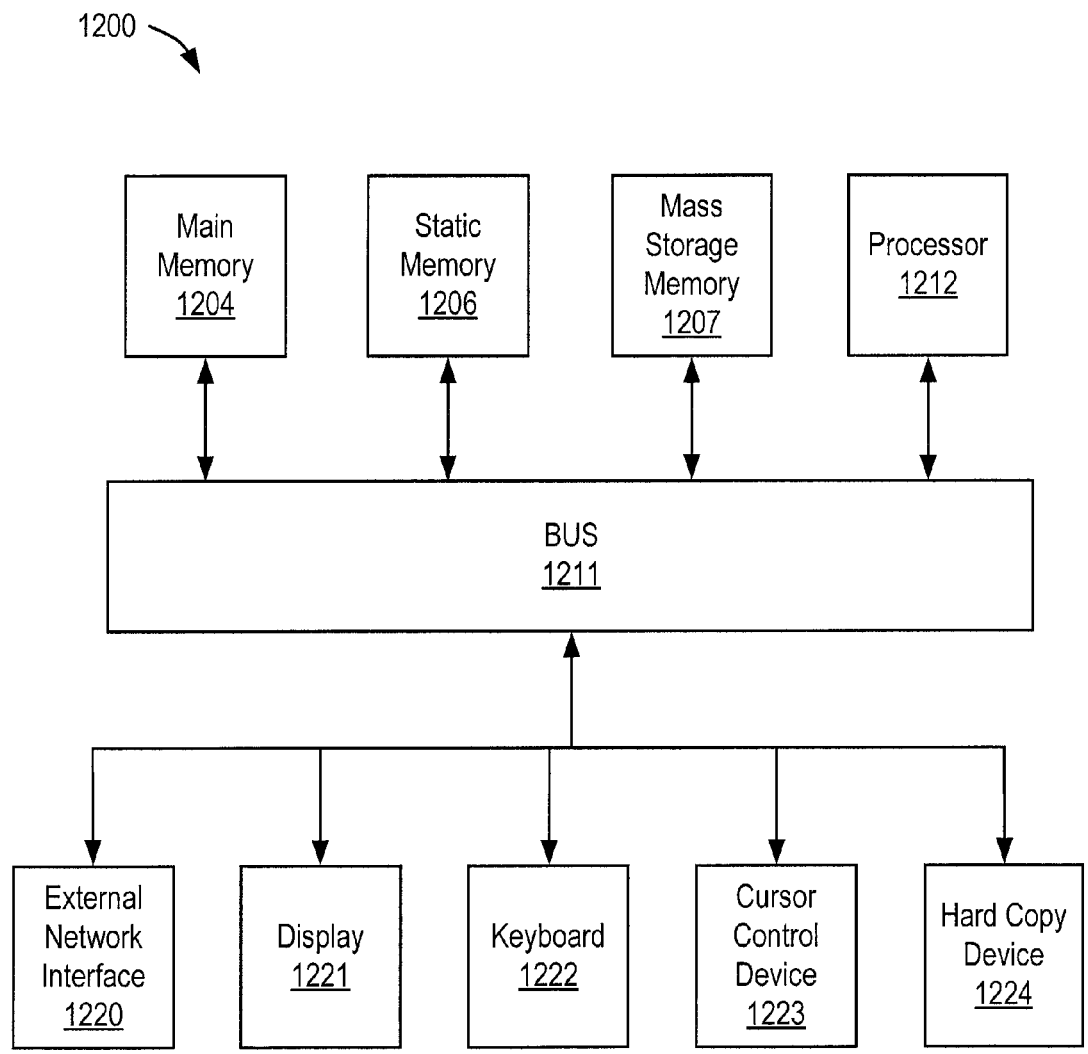
FIG. 12 is a block diagram of an exemplary computer system.
Figure 13:
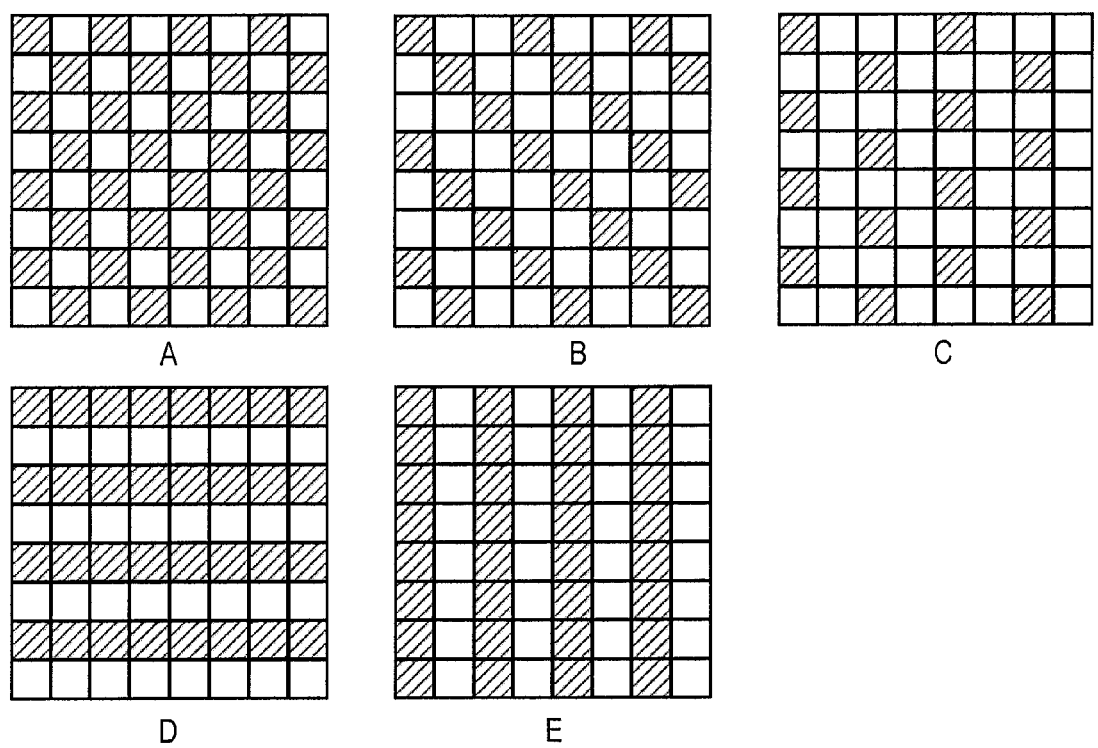
FIGS. 13A-E illustrate sample subsets of selected pixels.

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, Alpha™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

The present invention is not limited to personal computer and laptop computers. The present invention is applicable to mobile phones, smart phones, PDAs, portable players, etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving a first version of media at a first resolution;
   selecting sub-frames adaptively in an image created by upsampling the first version of the media;
   creating, with a computer processing system, a second version of the media at a second resolution higher or equal to the first resolution by applying at least one transform and adaptive thresholding to each of the selected sub-frames in the image, wherein the at least one transform is a directionally warped adaptive transform; and
   wherein the at least one directionally warped adaptive transform is selected based on local edge direction to render the highest quality output for the second version of the media by modulating the adaptive thresholding according to local pixel statistics for pixels at each of the selected sub-frames in the image.

2. The method defined in claim 1 wherein creating a second version of the media comprises:
   applying at least one warped transform to each sub-frame to create transform coefficients.

3. The method defined in claim 2 wherein the at least one warped transform comprises a 2-D separable discrete cosine transform (DCT) or a 2-D Hadamard transform.

4. The method defined in claim 2 wherein applying the at least one warped transform to a sub-frame to create transform coefficients comprises applying a transform to each of the selected sub-frames in the image.

5. The method defined in claim 4 wherein the sub-frames are adaptively selected at each pixel in the image.

6. The method defined in claim 4 wherein the at least one warped transform comprises a 2-D separable DCT or a 2-D Hadamard transform.

7. The method defined in claim 1 wherein the at least one transform comprises a 2-D separable DCT or a 2-D Hadamard transform.

8. The method defined in claim 1 wherein the adaptive thresholding includes application of spatially adaptive thresholds.

9. The method defined in claim 1 wherein creating a second version of the media comprises:
   computing an adaptive threshold; and
   thresholding transform coefficients with the adaptive threshold.

10. The method defined in claim 1 wherein creating a second version of the media comprises:
    upsampling the first version of media to create an upsampled image;
    transforming sub-frames in the upsampled image using a transform for each sub-frame;

thresholding transform coefficients for each transformed sub-frame with an adaptive threshold;

inverse transforming the thresholded transform coefficients to form processed sub-frames in the pixel-domain;

combining the processed sub-frames to create a new frame; and applying a data-consistency operation to the new frame.

11. The method defined in claim 10 wherein the transform comprises a 2-D separable DCT or a 2-D Hadamard transform.

12. The method defined in claim 11 further comprising setting the sub-frame to be non-pixel adaptive at every pixel.

13. The method defined in claim 10 further comprising setting the sub-frame to be non-pixel adaptive at every pixel.

14. The method defined in claim 10 further comprising selecting adaptively a transform for each sub-frame.

15. The method defined in claim 10 further comprising selecting a sub-frame adaptively at each pixel in the upsampled image.

16. The method defined in claim 15 wherein transforming sub-frames in the upsampled image comprises applying a transform to the selected sub-frame, wherein the transform comprises a 2-D separable DCT or a 2-D Hadamard transform.

17. The method defined in claim 10 further comprising computing one of more adaptive thresholds, and wherein thresholding transform coefficients for each transformed sub-frame with an adaptive threshold comprises thresholding transform coefficients for each transformed sub-frame with one of the one of more adaptive thresholds.

18. The method defined in claim 17 further comprising adaptively selecting the transform for a sub-frame selected at each pixel.

19. The method defined in claim 10 further comprising adaptively selecting the transform for a sub-frame selected at each pixel.

20. The method defined in claim 10 further comprising sending side-information indicative of a selected directionally warped adaptive transform from among a plurality of different transforms.

21. The method defined in claim 1 further comprising iteratively repeating the operations used to create the second version of the media for creating a third version of the media.

22. The method defined in claim 1 wherein creating a second version of the media comprises:
upsampling the first version of media;
selecting a sub-frame adaptively for each pixel in the upsampled image;
transforming each selected sub-frame using a transform, wherein the transform comprises a 2-D separable DCT or a 2-D Hadamard transform;
thresholding the transform coefficients;
inverse transforming the thresholded transform coefficients to form processed sub-frames in the pixel-domain;
combining the processed sub-frames to create a new frame; and
applying a data-consistency operation to the new frame, such that a second version of the media at a resolution higher than the first version of the media is created.

23. The method defined in claim 22 wherein the first version of the media is generated by a camera.

24. The method defined in claim 22 wherein the transform is a warped transform.

25. The method defined in claim 1 wherein the first version of media at the first resolution is generated in a video decoder and creating the second version of the media is performed as part of a post processing operation in the video decoder.

26. The method defined in claim 1 wherein the first version of media at the first resolution is generated in a video decoder and creating the second version of the media is performed as part by a loop filter in the video decoder.

27. The method defined in claim 1 wherein the first version of media is received by a mobile device in response to being transmitted in a wireless communication system, and further comprising sending the second version of the media to a high resolution display for display thereon.

28. The method defined in claim 27 wherein the mobile device creates the second version and sends the second version to the high resolution display.

29. The method defined in claim 27:
wherein the mobile device sends the first version to a docking station, and wherein the docking station creates the second version and sends the second version to the high resolution display.

30. The method defined in claim 1 wherein the first version of media is a video received from over a network by a terminal, and the terminal creates the second version for display thereon.

31. A method comprising:
selecting sub-frames adaptively in an image created by upsampling a first version of the image;
transforming, with a computer processing system, sub-frames in the image by applying a transform to each of the selected sub-frames in the image;
thresholding transform coefficients for each transformed sub-frame with an adaptive threshold;
wherein the transform is a directionally warped adaptive transform selected based on local edge direction to render the highest quality output for the image by modulating the adaptive thresholding according to local pixel statistics for pixels at each of the selected sub-frames in the image;
inverse transforming the thresholded transform coefficients to form processed sub-frames in the pixel-domain; and
combining the processed sub-frames to create a new frame.

32. The method defined in claim 31 wherein the directionally warped adaptive transform is selected independently at every pixel.

33. The method defined in claim 31 further comprising:
upsampling a first version of the media at a first resolution to create the image.

34. The method defined in claim 33 further comprising:
applying a data-consistency operation to the new frame.

35. The method defined in claim 31 further comprising setting the sub-frame to be non-pixel adaptive at every pixel.

36. The method defined in claim 31 further comprising selecting adaptively a transform for each sub-frame.

37. The method defined in claim 31 further comprising selecting a sub-frame adaptively at each pixel in the upsampled image.

38. The method defined in claim 37 wherein transforming sub-frames in the upsampled image comprises applying a 2-D separable DCT or a 2-D Hadamard transform to the selected sub-frame.

39. The method defined in claim 31 further comprising computing one of more adaptive thresholds, and wherein thresholding transform coefficients for each transformed sub-frame with an adaptive threshold comprises thresholding transform coefficients for each transformed sub-frame with one of the one of more adaptive thresholds.

40. The method defined in claim 39 further comprising adaptively selecting the transform for a sub-frame selected at each pixel.

41. The method defined in claim 31 further comprising adaptively selecting the transform for a sub-frame selected at each pixel.

42. The method of claim 31 further comprising sending side-information indicative of a selected directionally warped adaptive transform from among a plurality of different transforms.

43. A method comprising:
selecting sub-frames adaptively in an image;
transforming, with a computer processing system, each of the of selected sub-frames by applying a transform to each of the selected sub-frames in the image, wherein the transform is a directionally warped adaptive transform and comprises a 2-D separable DCT or a 2-D Hadamard transform;
thresholding the transform coefficients using a non-adaptive threshold;
wherein the directionally warped adaptive transform is selected based on local edge direction to render the highest quality output for the plurality of selected sub-frames according to local pixel statistics for pixels at each of the selected sub-frames in the image;
inverse transforming the thresholded transform coefficients to form processed sub-frames in a pixel-domain; and
combining the processed sub-frames to create a new frame.

44. The method defined in claim 43 further comprising:
upsampling a first version of media; and
selecting a sub-frame adaptively for each pixel in the upsampled image.

45. The method defined in claim 43 further comprising:
applying a data-consistency operation to the new frame.

46. The method defined in claim 43 wherein said each selected sub-frame is generated in a video decoder and creating the new frame is performed as part of a post processing operation in the video decoder.

47. The method defined in claim 43 wherein said each selected sub-frame is generated in a video decoder and creating the new frame is performed as part by a loop filter in the video decoder.

48. The method defined in claim 43 wherein said each selected sub-frame is received by a mobile device in response to being transmitted in a wireless communication system, and further comprising sending the new frame to a high resolution display for display thereon.

49. The method defined in claim 48 wherein the mobile device creates the new frame and sends the new frame to the high resolution display.

50. The method defined in claim 48:
wherein the mobile device sends said each selected sub-frame to a docking station, and wherein the docking station creates the new frame and sends the new frame to the high resolution display.

51. The method defined in claim 43 wherein said each selected sub-frame is part of a video received from over a network by a terminal, and the terminal creates the new frame for display thereon.

52. A non-transitory computer-readable storage medium having instructions stored thereon which, when executed by a system, causes the system to perform a method comprising:
receiving a first version of media at a first resolution;
selecting sub-frames adaptively in an image created by upsampling the first version of the media;
creating a second version of the media at a second resolution higher or equal to the first resolution by applying at least one transform and adaptive thresholding to each of the selected sub-frames in the image, wherein the at least one transform is a directionally warped adaptive transform; and
wherein the directionally warped adaptive transform is selected based on local edge direction to render the highest quality output for the second version of the media by modulating the adaptive thresholding according to local pixel statistics for pixels at each of the selected sub-frames in the image.

53. The non-transitory computer-readable storage medium defined in claim 52 wherein creating a second version of the media comprises applying a transform to a sub-frame to create transform coefficients, wherein the transform comprises a 2-D separable DCT or a 2-D Hadamard transform.

54. The non-transitory computer-readable storage medium defined in claim 53 wherein the method further comprising selecting sub-frames adaptively in an image created by upsampling the first version of the media, and further wherein applying the at least one warped transform to a sub-frame to create transform coefficients comprises applying a transform to each of the selected sub-frames in the image, wherein the transform comprises a 2-D separable DCT or a 2-D Hadamard transform.

55. The non-transitory computer-readable storage medium defined in claim 54 wherein the sub-frames are adaptively selected at each pixel in the image.

56. The non-transitory computer-readable storage medium defined in claim 52 wherein the adaptive thresholds comprise spatially adaptive thresholds.

57. The non-transitory computer-readable storage medium defined in claim 52 wherein creating a second version of the media comprises:
computing an adaptive threshold; and
thresholding transform coefficients with the adaptive threshold.

* * * * *